US012550878B2

(12) United States Patent
Warstler

(10) Patent No.: US 12,550,878 B2
(45) Date of Patent: Feb. 17, 2026

(54) MULTIFUNCTIONAL HORSE-HOOF AND STUD TOOL

(71) Applicant: Stephen Charles Warstler, Zionsville, IN (US)

(72) Inventor: Stephen Charles Warstler, Zionsville, IN (US)

( * ) Notice: Subject to any disclaimer, the term of this patent is extended or adjusted under 35 U.S.C. 154(b) by 0 days.

(21) Appl. No.: 19/219,673

(22) Filed: May 27, 2025

(65) Prior Publication Data

US 2025/0302027 A1 Oct. 2, 2025

Related U.S. Application Data

(60) Provisional application No. 63/570,590, filed on Mar. 27, 2024.

(51) Int. Cl.
*A01L 11/00* (2006.01)

(52) U.S. Cl.
CPC .................................... *A01L 11/00* (2013.01)

(58) Field of Classification Search
CPC ................................ A01L 11/00; A01L 15/00
USPC .................................................. 168/45–48.2
See application file for complete search history.

(56) References Cited

U.S. PATENT DOCUMENTS

| | | | | | |
|---|---|---|---|---|---|
| 541,793 | A * | 6/1895 | Schenck | B26B 11/00 | 168/48.1 |
| 544,540 | A * | 8/1895 | Jones | A01L 11/00 | 30/155 |
| 634,336 | A * | 10/1899 | Greer | B26B 11/00 | 7/165 |
| 910,789 | A * | 1/1909 | Cunningham | B25B 13/06 | 7/168 |
| 1,015,026 | A * | 1/1912 | Jackson et al. | B25F 1/04 | 7/168 |
| 1,039,482 | A * | 9/1912 | Bauer | B25F 1/04 | 7/168 |
| 1,845,038 | A * | 2/1932 | Alderson | B25F 1/00 | 292/1 |
| 4,187,607 | A * | 2/1980 | Simuro | B26B 11/001 | 168/48.1 |
| 4,283,805 | A * | 8/1981 | Stacy | B25B 7/22 | 7/161 |

(Continued)

FOREIGN PATENT DOCUMENTS

| | | | |
|---|---|---|---|
| CN | 218194998 U | * | 1/2023 |
| CN | 219371890 U | * | 7/2023 |

(Continued)

*Primary Examiner* — Morgan T Jordan

(57) ABSTRACT

A multifunctional horse-hoof and stud tool is a device that allows users to do all the tasks involved in cleaning existing threads, cleaning the hoof, and installing studs in a horse's shoe. More specifically, the device is a tool that allows users to have all the items needed in one hand while using the other hand to hold the leg of the horse. To that end, a hoof pick attachment enables users to pick hoofs and remove mud and dirt from the center of the hoof. Further, a small pick with a barb removes packed dirt and small stones from existing threaded holes, and a small brush cleans threaded holes. A palm style tap attachment with a gripping surface helps clean threads without the risk of horseshoes breaking off, if the horse put its foot down while cleaning. Additionally, a socket drive is used to install different size studs.

20 Claims, 9 Drawing Sheets

(56) References Cited

U.S. PATENT DOCUMENTS

| | | | | | |
|---|---|---|---|---|---|
| 4,367,798 | A * | 1/1983 | Sabol | A01K 13/002 | 168/48.1 |
| D270,104 | S * | 8/1983 | Jensen | 168/48.2 | |
| 5,176,222 | A * | 1/1993 | Tippin | A01L 15/00 | 168/48.1 |
| 5,280,659 | A * | 1/1994 | Park | B25F 1/003 | 7/128 |
| 5,787,535 | A * | 8/1998 | Epstein | B27B 17/00 | 7/168 |
| 6,257,100 | B1 * | 7/2001 | Tai | B25B 13/56 | 81/142 |
| 7,284,557 | B1 * | 10/2007 | Williams | A45D 24/00 | 7/168 |
| 7,481,137 | B1 * | 1/2009 | Johnson | B25B 15/008 | 81/177.4 |
| 8,312,580 | B2 * | 11/2012 | Lee | B26B 11/00 | 7/118 |
| 10,058,988 | B1 * | 8/2018 | Pintal | B25F 1/006 | |
| 10,478,957 | B1 * | 11/2019 | Keele | B25B 15/005 | |
| 10,974,380 | B1 * | 4/2021 | Diaz | B25F 1/003 | |
| 2002/0005095 | A1 * | 1/2002 | Anderson | B25F 1/003 | 81/440 |
| 2002/0069729 | A1 * | 6/2002 | Anderson | B25F 1/02 | 81/440 |
| 2006/0032345 | A1 * | 2/2006 | Crawley | B25B 7/22 | 81/439 |
| 2006/0113091 | A1 * | 6/2006 | Millard | A01L 11/00 | 168/45 |
| 2007/0243753 | A1 * | 10/2007 | Huang | B25B 13/44 | 439/453 |
| 2009/0000038 | A1 * | 1/2009 | Padden | B25F 1/006 | 7/128 |
| 2011/0162149 | A1 * | 7/2011 | Merten | B25F 1/04 | 7/138 |
| 2012/0186403 | A1 * | 7/2012 | Chen | B25B 13/56 | 81/62 |
| 2013/0205952 | A1 * | 8/2013 | Lovely | B25B 13/56 | 81/57.5 |
| 2016/0205914 | A1 * | 7/2016 | Jemail | A01L 15/00 | |
| 2017/0020234 | A1 * | 1/2017 | Taylor | A44B 11/2526 | |
| 2018/0311803 | A1 * | 11/2018 | Hertaus | B23D 51/10 | |
| 2019/0084132 | A1 * | 3/2019 | Dinihanian, Jr. | B25F 1/04 | |
| 2019/0217843 | A1 * | 7/2019 | Obal | B60T 17/18 | |
| 2020/0171642 | A1 * | 6/2020 | Newman | B25B 13/5058 | |
| 2020/0267960 | A1 * | 8/2020 | Moffett | A01L 15/00 | |
| 2021/0120800 | A1 * | 4/2021 | Wenzel | A01L 15/00 | |
| 2021/0197354 | A1 * | 7/2021 | Pfeiffer | B62K 21/12 | |
| 2021/0213589 | A1 * | 7/2021 | Thomas | B25B 23/0028 | |
| 2021/0291341 | A1 * | 9/2021 | Granado | B23D 49/12 | |
| 2022/0212329 | A1 * | 7/2022 | Kerson | B25F 1/04 | |
| 2023/0286069 | A1 * | 9/2023 | Roark | B23D 65/02 | |

FOREIGN PATENT DOCUMENTS

| | | | | |
|---|---|---|---|---|
| DE | 102022109169 | A1 * | 10/2023 | A01K 13/002 |
| WO | WO-9630165 | A1 * | 10/1996 | B25B 7/00 |
| WO | WO-2013066140 | A1 * | 5/2013 | B25G 1/085 |

* cited by examiner

MULTIFUNCTIONAL HORSE-HOOF AND STUD TOOL

The current application claims a priority to the U.S. provisional patent application Ser. No. 63/570,590 filed on Mar. 27, 2024. The U.S. provisional patent application 63/570,590 is revived within the two-month period for unintentional abandonment by May 27, 2024.

FIELD OF THE INVENTION

The present invention generally relates to a multipurpose tool for mending a horse hoof. More specifically, the present invention is an apparatus to clean horse hooves and install studs for traction.

BACKGROUND OF THE INVENTION

Multiple tools and accessories are required usually, for someone to do all the tasks involved in cleaning existing threads, cleaning the hoof, and installing studs in a horse's shoe. Further, while holding up the leg of a 2000 lb horse the horse may decide to put its foot down. In such scenarios, users won't have time to fumble around looking for five different tools. In other words, users who are involved in cleaning or mending a horse hoof, or installing studs for traction must have all tools handy so that they can get to them quickly.

Therefore, an objective of the present invention is to provide users with a multifunctional tool that allows them to have all the items needed in one hand on one tool while using the other hand to hold the leg of the horse. More specifically, the present invention enables users to pick hoofs and remove mud and dirt from the center of the hoof. Further, a small pick with a barb removes packed dirt and small stones from existing threaded holes. The present invention further includes a notch to remove small stones. A small brush helps clean threaded holes. A removable palm style tap cleans threads, and multi-size pinned sockets are used to install new studs needed for traction. Additionally, a socket drive is used so that other size sockets may be used to install different size studs. Thus, the present invention is a multifunctional and user-friendly tool for horse-hoof maintenance and cleaning.

SUMMARY OF THE INVENTION

The present invention is intended to provide users with a multifunctional tool that allows users to have all the items needed in one hand on one tool while using the other hand to hold the leg of the horse. More specifically, the present invention enables users to pick hoofs and remove mud and dirt from the center of the hoof. Further, a small pick with a barb removes packed dirt and small stones from existing threaded holes. The present invention further includes a notch to remove small stones. A small brush helps clean threaded holes. A removable palm style tap cleans threads, and multi-size pinned sockets are used to install new studs needed for traction. Additionally, a socket drive is used so that other size sockets may be used to install different size studs. Thus, the present invention is a multifunctional and user-friendly tool for horse-hoof maintenance and cleaning.

DETAILED DESCRIPTION OF THE INVENTION

Figure 1:
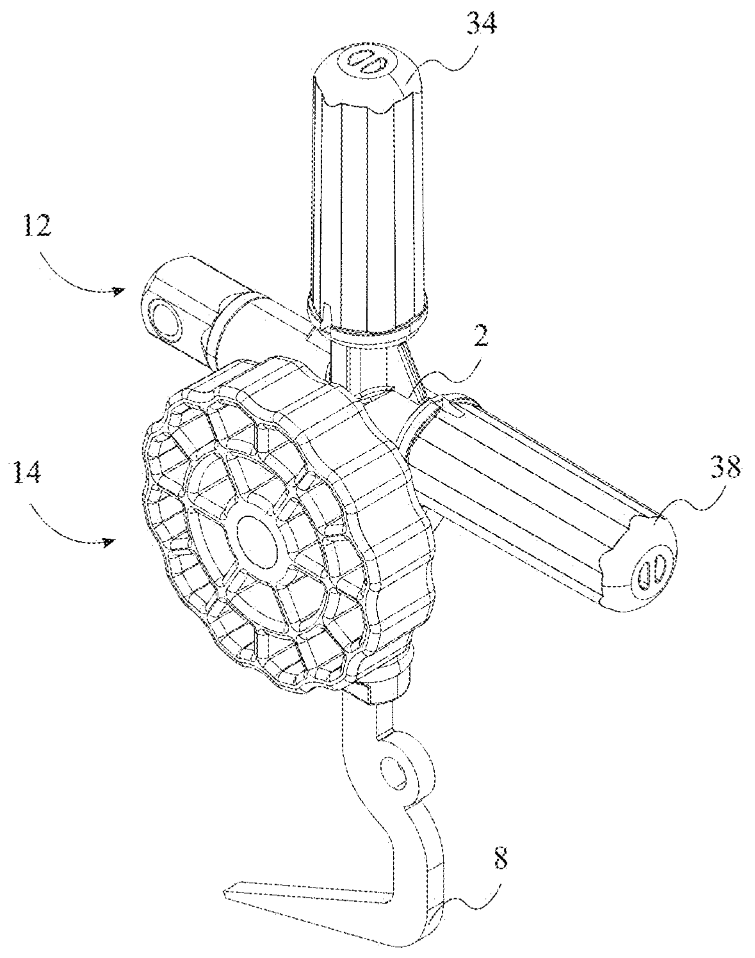
FIG. 1 is a top-front-left perspective view of a multifunctional tool according to a preferred embodiment of the present invention.

All illustrations of the drawings are for the purpose of describing selected versions of the present invention and are not intended to limit the scope of the present invention.

The following description is in reference to FIG. 1 through FIG. 9. According to a preferred embodiment, the present invention comprises a main body 2, a fastening hole 4, a brush attachment 6, a hoof pick attachment 8, a barbed pick attachment 10, a socket drive adapter 12, and a palm tap attachment 14. The main body 2 comprises a first main surface 16 and a second main surface, wherein the first main surface 16 is positioned opposite to the second main surface 18 about the main body 2. In other words, the first main surface 16 constitutes a front surface of the main body 2 and the second main surface 18 constitutes a rear surface of the main body 2. In the preferred embodiment, the main body 2 forms the central support structure of the present invention, wherein the rest of the components of the present invention are attached to. To that end, the main body 2 is made of a sturdy material such as hard plastic, metal, wood, etc. However, the main body 2 may comprise any other dimensions, shape, material, components, arrangement of components, etc. as long as the intents of the present invention are not altered.

Figure 2:
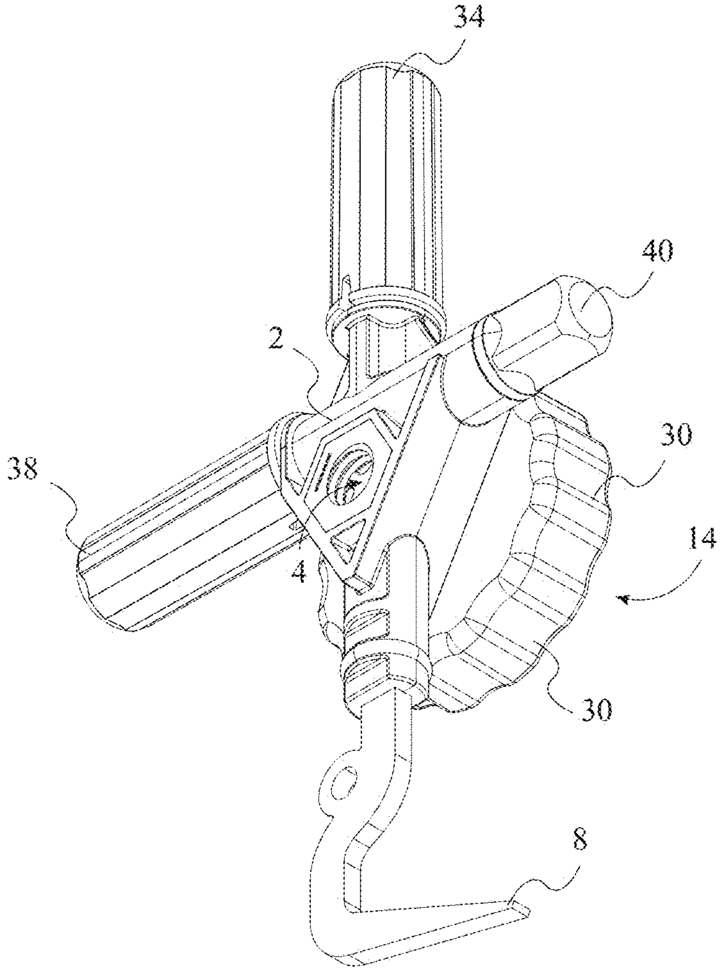
FIG. 2 is a bottom-rear-right perspective view of the present invention.
Figure 3:
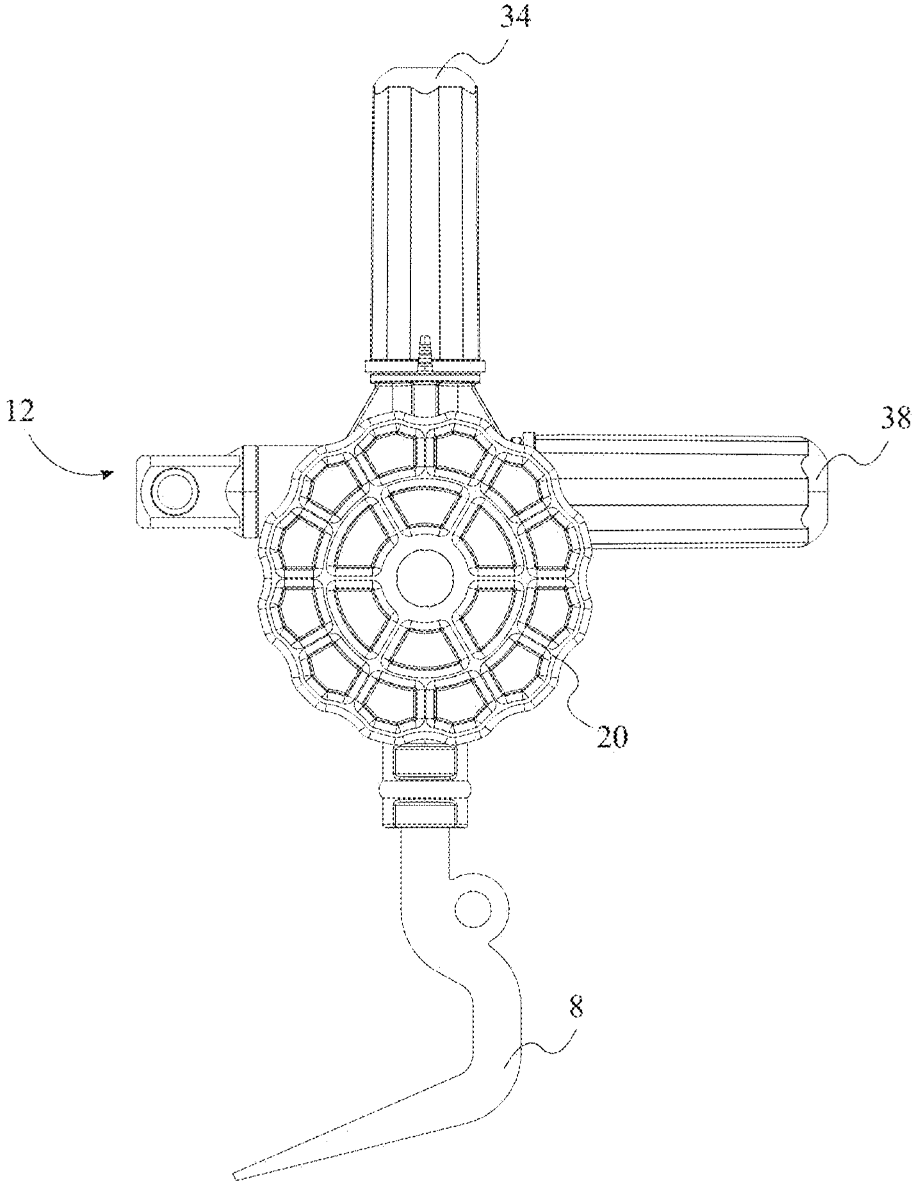
FIG. 3 is a front elevational view of the present invention.
Figure 4:
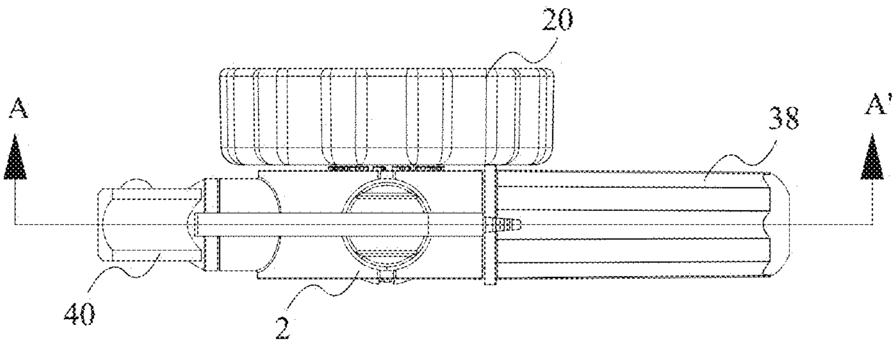
FIG. 4 is a bottom plan view of the present invention.
Figure 6:
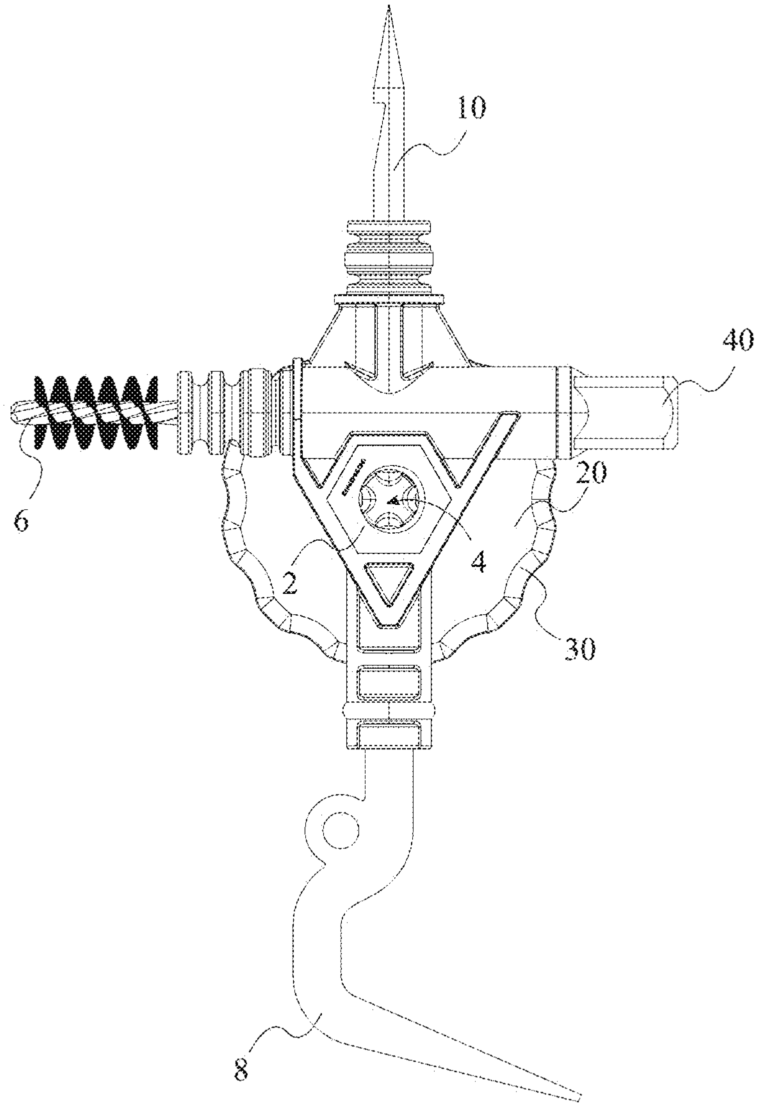
FIG. 6 is a rear elevational view, wherein caps mounted over a barbed-pick attachment and a brush attachment are not shown.
Figure 7:
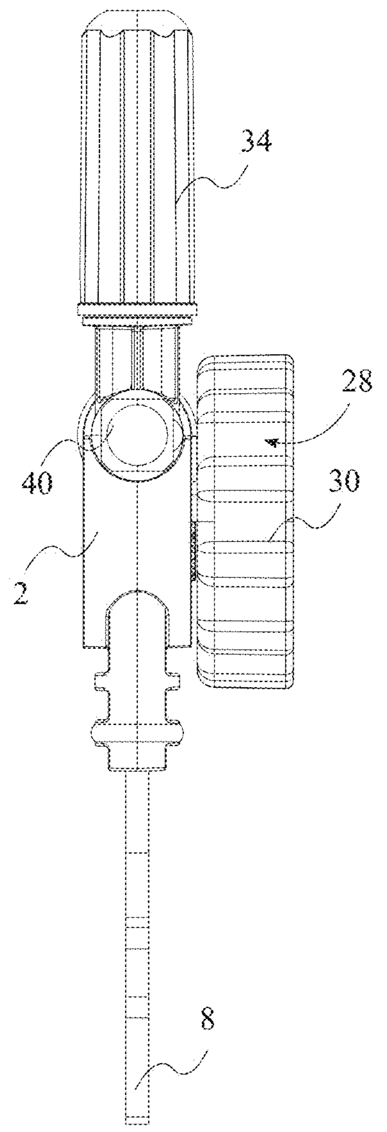
FIG. 7 is a left side elevational view of the present invention.

As seen in FIG. 2, FIG. 6, FIG. 8, and FIG. 9, the fastening hole 4 traverses through the main body 2. The fastening hole 4 is intended to attach the palm tap attachment 14 to the main body 2. Accordingly, the palm tap attachment 14 is threadibly mounted into the fastening hole 4. As seen in FIG. 2 and FIG. 6, the fastening hole 4 is positioned adjacent to the hoof pick attachment 8.

As seen in FIG. 1 through FIG. 9, the brush attachment 6, the hoof pick attachment 8, the barbed pick attachment 10 and the socket drive adapter 12 are distributed about the main body 2. Preferably, the hoof pick attachment 8 picks a horse's hoof, removing mud and dirt from the center of the hoof. The barbed pick attachment 10 is a smaller pick that the hoof pick attachment 8, with a barb along its body. The barbed pick attachment 10 removes packed dirt and small stones from existing threaded holes. The barb is typically a notch that helps to remove small stones. The brush attachment 6 includes a small brush that helps clean threaded holes. Further, the socket drive adapter 12 includes a ⅜" socket drive for customer supplied sockets and a ⅜" drive universal pin socket 42. Furthermore, as seen in FIG. 1 and FIG. 2, the brush attachment 6, the hoof pick attachment 8, the barbed pick attachment 10, and the socket drive adapter 12 are peripherally mounted to the main body 2. In other words, the arrangement of the above-mentioned components of the present invention around the main body 2 will replace four existing tools needed to do the same job. In the preferred embodiment, the brush attachment 6 is mounted opposite to the socket drive adapter 12 about the main body 2, and the hoof pick attachment 8 is mounted opposite to the barbed pick attachment 10 about the main body 2. However, the individual tools may be arranged in any other location, or orientation around the main body 2, as long as the objectives of the present invention are not altered. As seen in FIG. 1, the palm tap attachment 14 is mounted onto the first main surface 16. Preferably, the palm tap attachment 14 cleans threads and the palm tap attachment 14 constitutes the fifth tool in the multi-functional device.

A more detailed description of the present invention follows.

Figure 9:
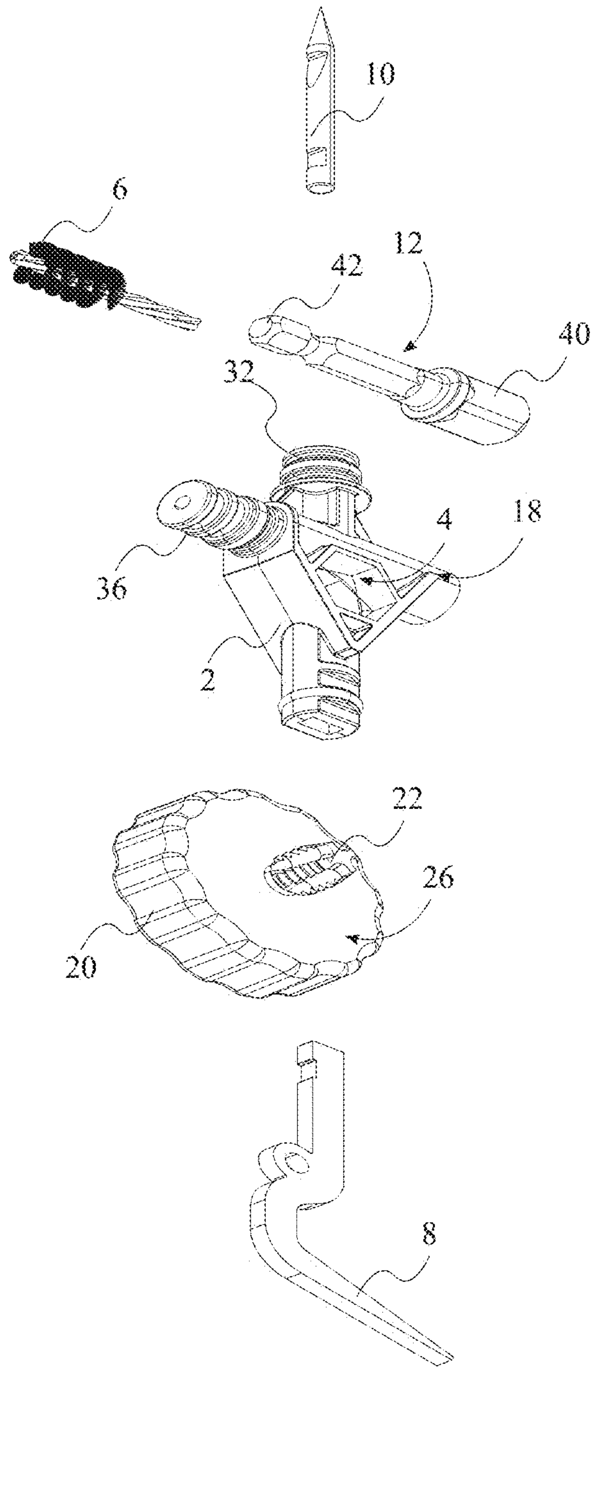
FIG. 9 is an is an exploded bottom-rear perspective view of the present invention.

Continuing with the preferred embodiment, the palm tap attachment 14 is a removeable palm tap which fits into the palm of your hand and finger tips and allows you to clean out the threads much easier than a standard T-tap tool. To that end, the palm tap attachment 14 may comprise a handle body 20 and a fastening protrusion 22. The handle body 20 constitutes the main central structure of the palm tap attachment 14, and a transversal cross section of the handle body 20 is preferably circular. The handle body 20 may comprise a first handle surface 24, a second handle surface 26, and a lateral handle surface 28, wherein the first handle surface 24 is positioned opposite to the second handle surface 26 about the handle body 20. More specifically, the first handle surface 24 constitutes a rear surface of the handle body 20, and the second handle surface 26 constitutes a front surface of the handle body 20. The lateral handle surface 28 is positioned between the first handle surface 24 and the second handle surface 26. As seen in FIG. 9, the fastening protrusion 22 is centrally mounted onto the first handle surface 24. When not in use, the fastening protrusion 22 is threadibly engaged into the fastening hole 4, as seen in FIG. 1 and FIG. 2. It should be noted that any other additional attachments, fastening elements, etc. that are known to one of ordinary skill in the art falls under the scope of the present invention, as long as the intents of the present invention are not altered. Examples of such fastening elements include, but are not limited to nuts, bolts, screws, etc.

Usually, users run the risk of the horse putting his foot down while the tap is threaded, which may lead to the shoe breaking off, causing another problem during repair or replacement. With the palm tap attachment of the present invention, if the horse puts his foot down, the handle body 20 will remain parallel with the shoe and should not break off like a standard T-tap tool is likely to do. The palm tap attachment 14 allows down pressure and not side-to-side pressure as the T-tap tool does. To accomplish this, the second handle surface 26 is a flat surface.

Figure 8:
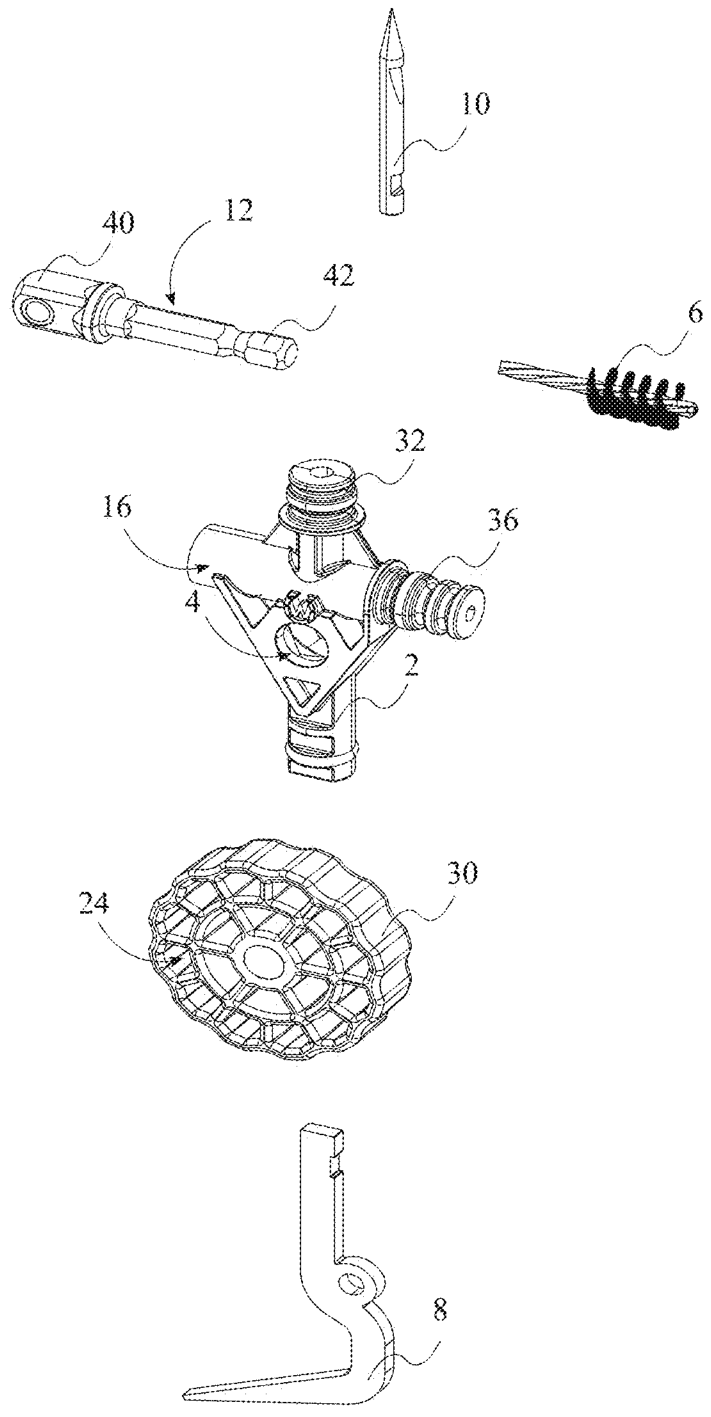
FIG. 8 is an exploded top-front perspective view of the present invention.

Continuing with the preferred embodiment, the present invention may comprise a plurality of gripping features 30, wherein the plurality of gripping features 30 is integrated into and around the lateral handle surface 28. As seen in FIG. 1 and FIG. 8, the plurality of gripping features 30 includes a plurality of ridges and valleys that provides a user with an ergonomic grip. However, the plurality of gripping features 30 may comprise any other shape, features, components, arrangement of components, etc. that are known to one of ordinary skill in art, as long as the intents of the present invention are not altered.

As seen in FIG. 1 and FIG. 2, the present invention may further comprise a first cap-fastening feature 32 and a first cap 34. Preferably, the first cap-fastening feature 32 is positioned between the barbed pick attachment 10 and the main body 2 as a protective covering to the barbed pick attachment 10. In other words, the barbed pick attachment 10 is enclosed between the first cap 34 and the main body 2. Furthermore, the first cap 34 is threadibly engaged to the first cap-fastening feature 32, so as to provide a tight and secure enclosure to the barbed pick attachment 10, when not in use.

Similarly, the present invention may further comprises a second cap-fastening feature 36 and a second cap 38. Preferably, the second cap-fastening feature 36 is positioned between the brush attachment 6 and the main body 2 as a protective covering to the brush attachment 6. In other words, the brush attachment 6 is enclosed between the second cap 38 and the main body 2. Furthermore, the second cap 38 is threadibly engaged to the second cap-fastening feature 36, so as to provide a tight and secure enclosure to the brush attachment 6, when not in use.

Figure 5:
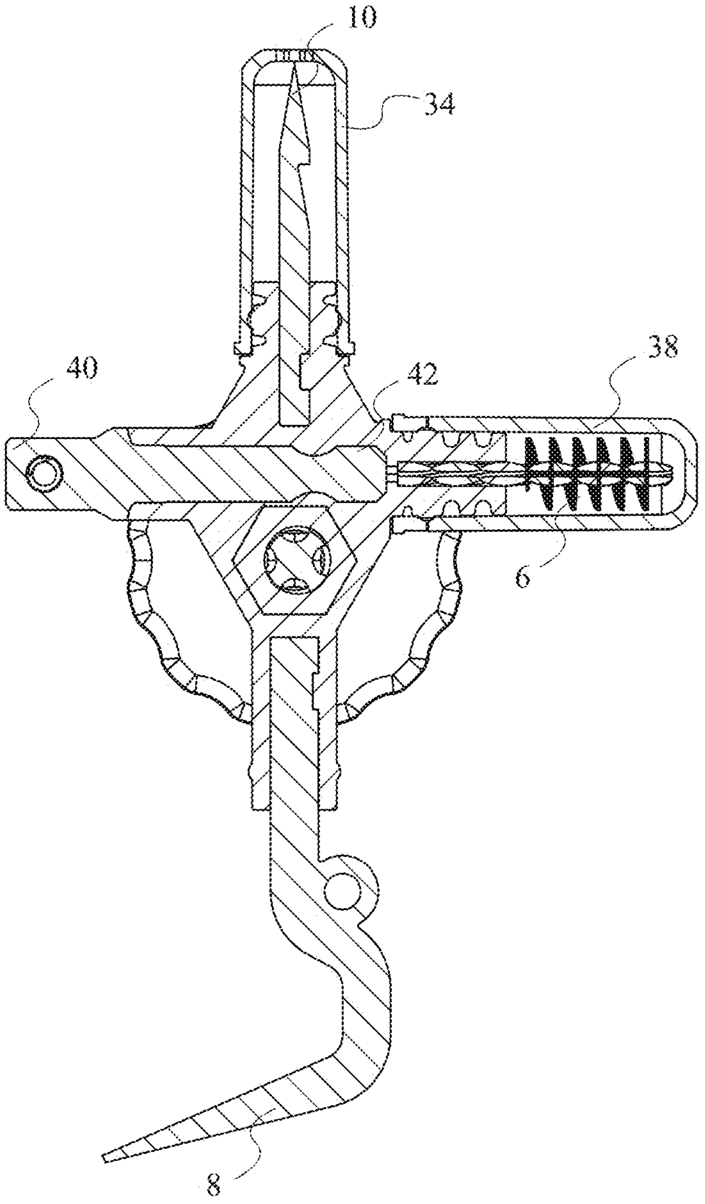
FIG. 5 is a sectional view of the present invention taken along A-A' of FIG. 4.

Continuing with the preferred embodiment, the socket drive adapter 12 may comprise a socket driver 40 and a universal pin socket 42. Preferably, the socket driver is a ⅜" socket driver 40 for customer supplied sockets and the universal pin socket 42 is a ⅜" drive universal pin socket 42. As seen in FIG. 5, the socket driver 40 is positioned opposite to the universal pin socket 42 along the socket drive adapter 12. Furthermore, the socket drive adapter 12 is mounted into the main body 2.

Thus, the present invention is a multipurpose tool that allows users to do all the tasks involved in cleaning existing threads, cleaning the hoof, and installing studs in the horse's shoe.

Although the invention has been explained in relation to its preferred embodiment, it is to be understood that many other possible modifications and variations can be made without departing from the spirit and scope of the invention as hereinafter claimed.

What is claimed is:

1. A multifunctional horse-hoof and stud tool comprising:
a main body;
a fastening hole;
a brush attachment;
a hoof pick attachment;
a barbed pick attachment;
a socket drive adapter;
a palm tap attachment;
the main body comprising a first main surface and a second main surface;
the first main surface being positioned opposite to the second main surface about the main body;
the fastening hole traversing through the main body;
the brush attachment, the hoof pick attachment, the barbed pick attachment, and the socket drive adapter being distributed about the main body;
the brush attachment, the hoof pick attachment, the barbed pick attachment, and the socket drive adapter being peripherally mounted to the main body;
the palm tap attachment being mounted onto the first main surface;
the brush attachment being mounted opposite to the socket drive adapter about the main body;
the hoof pick attachment being mounted opposite to the barbed pick attachment about the main body; and
the palm tap attachment being threadibly mounted into the fastening hole.

2. The multifunctional horse-hoof and stud tool of claim 1 further comprising:
the palm tap attachment comprising a handle body and a fastening protrusion;

the handle body comprising a first handle surface, a second handle surface, and a lateral handle surface;
the first handle surface being positioned opposite to the second handle surface about the handle body;
the lateral handle surface being positioned between the first handle surface and the second handle surface;
the fastening protrusion being centrally mounted onto the first handle surface; and
the fastening protrusion being threadibly engaged into the fastening hole.

3. The multifunctional horse-hoof and stud tool of claim 2 comprising:
a plurality of gripping features; and
the plurality of gripping features being integrated into and around the lateral handle surface.

4. The multifunctional horse-hoof and stud tool of claim 2, wherein a transversal cross section of the handle body is circular.

5. The multifunctional horse-hoof and stud tool of claim 2, wherein the second handle surface is a flat surface.

6. The multifunctional horse-hoof and stud tool of claim 1 comprising:
a first cap-fastening feature;
a first cap;
the first cap-fastening feature being positioned between the barbed pick attachment and the main body;
the barbed pick attachment being enclosed between the first cap and the main body; and
the first cap being threadibly engaged to the first cap-fastening feature.

7. The multifunctional horse-hoof and stud tool of claim 1 comprising:
a second cap-fastening feature;
a second cap;
the second cap-fastening feature being positioned between the brush attachment and the main body;
the brush attachment being enclosed between the second cap and the main body; and
the second cap being threadibly engaged to the second cap-fastening feature.

8. The multifunctional horse-hoof and stud tool of claim 1 further comprising:
the socket drive adapter comprising a socket driver and a universal pin socket; and
the socket driver being positioned opposite to the universal pin socket along the socket drive adapter.

9. The multifunctional horse-hoof and stud tool of claim 1, wherein the socket drive adapter is mounted into the main body.

10. The multifunctional horse-hoof and stud tool of claim 1, wherein the main body is a flat-shaped body, and wherein a profile of the flat-shaped body is a diamond shape.

11. The multifunctional horse-hoof and stud tool of claim 1, wherein the fastening hole is positioned adjacent to the hoof pick attachment.

12. A multifunctional horse-hoof and stud tool comprising:
a main body;
a fastening hole;
a brush attachment;
a hoof pick attachment;
a barbed pick attachment;
a socket drive adapter;
a palm tap attachment;
the main body comprising a first main surface and a second main surface;
the palm tap attachment comprising a handle body and a fastening protrusion;
the handle body comprising a first handle surface, a second handle surface, and a lateral handle surface;
the first main surface being positioned opposite to the second main surface about the main body;
the fastening hole traversing through the main body;
the brush attachment, the hoof pick attachment, the barbed pick attachment, and the socket drive adapter being distributed about the main body;
the brush attachment, the hoof pick attachment, the barbed pick attachment, and the socket drive adapter being peripherally mounted to the main body;
the palm tap attachment being mounted onto the first main surface;
the first handle surface being positioned opposite to the second handle surface about the handle body;
the lateral handle surface being positioned between the first handle surface and the second handle surface;
the fastening protrusion being centrally mounted onto the first handle surface;
the fastening protrusion being threadibly engaged into the fastening hole;
the brush attachment being mounted opposite to the socket drive adapter about the main body;
the hoof pick attachment being mounted opposite to the barbed pick attachment about the main body; and
the palm tap attachment being threadibly mounted into the fastening hole.

13. The multifunctional horse-hoof and stud tool of claim 12 comprising:
a plurality of gripping features; and
the plurality of gripping features being integrated into and around the lateral handle surface.

14. The multifunctional horse-hoof and stud tool of claim 12, wherein a transversal cross section of the handle body is circular.

15. The multifunctional horse-hoof and stud tool of claim 12, wherein the second handle surface is a flat surface.

16. The multifunctional horse-hoof and stud tool of claim 12 comprising:
a first cap-fastening feature;
a first cap;
the first cap-fastening feature being positioned between the barbed pick attachment and the main body;
the barbed pick attachment being enclosed between the first cap and the main body; and
the first cap being threadibly engaged to the first cap-fastening feature.

17. The multifunctional horse-hoof and stud tool of claim 12 comprising:
a second cap-fastening feature;
a second cap;
the second cap-fastening feature being positioned between the brush attachment and the main body;
the brush attachment being enclosed between the second cap and the main body; and
the second cap being threadibly engaged to the second cap-fastening feature.

18. The multifunctional horse-hoof and stud tool of claim 12 further comprising:
the socket drive adapter comprising a socket driver and a universal pin socket; and
the socket driver being positioned opposite to the universal pin socket along the socket drive adapter.

19. The multifunctional horse-hoof and stud tool of claim 12, wherein the socket drive adapter is mounted into the main body.

20. The multifunctional horse-hoof and stud tool of claim 12, wherein the main body is a flat-shaped body, and wherein a profile of the flat-shaped body is a diamond shape.

* * * * *